United States Patent [19]

Miess et al.

[11] Patent Number: 5,097,015

[45] Date of Patent: Mar. 17, 1992

[54] FULLY AROMATIC COPOLYAMIDE FROM 4,4'-DIAMINO BENZANILIDE

[75] Inventors: Georg-Emerich Miess, Birkenweg; Peter Klein, Fasanerweg, both of Fed. Rep. of Germany

[73] Assignee: Hoechst Aktiengesellschaft, Frankfurt am Main, Fed. Rep. of Germany

[21] Appl. No.: 601,504

[22] Filed: Oct. 23, 1990

[30] Foreign Application Priority Data

Oct. 25, 1989 [DE] Fed. Rep. of Germany ....... 3935472

[51] Int. Cl.$^5$ .................... C08G 69/32; C08G 69/36
[52] U.S. Cl. .................... 528/331; 521/189; 528/125; 528/128; 528/183; 528/184; 528/185; 528/321
[58] Field of Search ............... 528/331, 321, 183, 185, 528/184, 125, 128; 521/189

[56] References Cited

U.S. PATENT DOCUMENTS

| | | | |
|---|---|---|---|
| 4,511,709 | 4/1985 | Yoon et al. | 528/331 |
| 4,987,215 | 1/1991 | Keil et al. | 528/331 |
| 4,987,216 | 1/1991 | Keil et al. | 528/331 |

Primary Examiner—Harold D. Anderson

[57] ABSTRACT

Aromatic copolyamides are described which are soluble in organic polyamide solvents and contain at least 95 mol % of repeating structural units of the formulae A: —OC—Ar—CO—

-continued

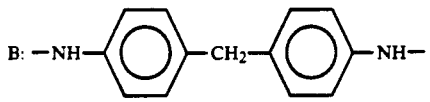

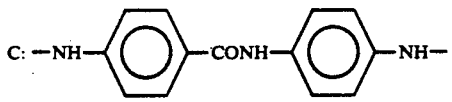

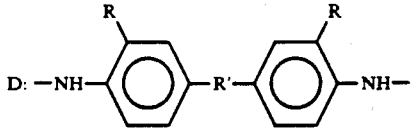

and up to 5 mol % of structural units E and/or F containing m-bonds and being derived from aromatic dicarboxylic acids (E') and/or aromatic diamines (F'), the sums of the molar proportions of structural units A+E and the molar proportions of structural units B+C+D+F being essentially the same. In these formulae, —Ar— is a divalent aromatic radical whose valence bonds are in the para or comparable coaxial or parallel position, —R is hydrogen, lower alkyl radicals, lower alkoxy radicals or halogen, and R' is a direct bond, a polymethylene chain of 2 to 6 carbon atoms, —O—, —S—, —CO— or —SO$_2$—, or a group of the formula —O—Ar'—O—, in which Ar' has the same meanings as Ar. The proportions of the diamine structural units B, C and D, relative to the total amount of these diamine structural units, are within the following limits:

| | |
|---|---|
| structural unit B: | 5-60 mol %, |
| structural unit C: | 10-80 mol %, |
| structural unit D: | 10-85 mol %. |

12 Claims, No Drawings

FULLY AROMATIC COPOLYAMIDE FROM 4,4'-DIAMINO BENZANILIDE

DESCRIPTION

The invention relates to new, fully aromatic polyamides of the dicarboxylic acid/diamine type which can be spun from their solutions in organic solvents and to shaped articles manufactured therefrom, such as filaments, fibers, fiber pulp, films, sheets and membranes having a very high initial modulus (modulus of elasticity) and to processes for their preparation.

As is known, aromatic polyamides (polyaramides) are raw materials of high thermal and chemical stability and low flammability. Thus, for example, fibers and sheets composed of these raw materials have very good mechanical properties, such as high strength and high initial modulus (modulus of elasticity) and are highly suitable for industrial areas of application—for example for reinforcing plastics or as filter materials.

The preparation of the required polymers is most advantageously effected in a known manner by reacting aromatic diamines with aromatic dicarbonyl dichlorides in aprotic organic solvents of the amide type (N,N-dimethylacetamide, N-methylpyrrolidone, N,N,N',N'-tetramethylurea and the like)—if appropriate in the presence of calcium halides or lithium halides—and neutralizing the hydrogen chloride formed, for example with calcium oxide.

Polyaramides having a high strength and a high initial modulus are those in which the amide bonds on the aromatic rings are oriented coaxially or almost parallel to one another, resulting in the formation of rigid, rod-like polymer molecules.

A typical polyamide of this type is, for example, poly(p-phenyleneterephthalamide). Filaments made of this material are described, for example, in German Patent 2,219,703.

This polyamide has a number of advantages, but its preparation and its processing are very difficult. Owing to its poor solubility in polar organic solvents—even in the presence of inorganic salts such as calcium chloride or lithium chloride as solubilizer—this polymer precipitates from the reaction medium almost as soon as it is formed. It needs to be isolated, washed, dried and then again dissolved in a spinning solvent. The preferred solvent for the preparation of spinning solutions is concentrated sulfuric acid, which causes particular problems during handling (work safety, corrosion) and waste disposal.

The attempt has therefore been made to circumvent these difficulties by developing copolyamides which have good solubility in the known amide solvents, which can also be readily spun and the filaments of which, after drawing, are distinguished by high strength values and initial moduli.

Thus, for example, DE-A 2,144,126 describes the preparation of soluble aromatic polyamides having high moduli of elasticity, according to which substituted 3-(p-aminophenoxy)-4-aminobenzanilide when reacted with terephthaloyl chloride give readily soluble polyamides which can be spun and drawn to give filaments having good strength and initial moduli.

The increased solubility is here caused by the meta orientation and the oxygen bridging atom German Patent 2,556,883 and German Offenlegungsschrift 3,007,063 describe copolyamides obtained from terephthalic acid, p-phenylenediamine and 3,4'-diaminodiphenyl ether which give isotropic solutions in amide solvents, which can be readily spun. Due to very extensive drawing, the filaments obtain high strength and moduli. The disadvantage of the two abovementioned processes is that their required unsymmetrical diamines can only be prepared and purified in very expensive processes.

That is why DE-A 3,510,655 and 3,605,394 and EP-A 0,199,090 describe terephthalamides having 3 diamine components in specific defined proportions, which are readily soluble in amide solvents and, upon shaping, give filaments or sheets having very good strength and moduli but comparatively low elongation at break.

Accordingly, the object of the present invention is to find aromatic copolyamides which can be converted using amide solvents into shaped articles which are then distinguished by a number of physical properties. When filaments and fibers are produced, it is in particular desired that after appropriate drawing processes an optimum combination of high strength and high elongation at break can be achieved and comparatively high initial moduli can be obtained. The monomers required for the preparation of the copolyamides should be easily accessible, and the polymer solutions obtained by polycondensation should be capable, after a filtration process and an appropriate degassing, of being spun or shaped directly.

It has been possible to find novel aromatic copolyamides which are composed predominantly of para-substituted aromatic chain components and are nevertheless surprisingly soluble in amide solvents and can be processed from these solutions to give shaped articles, such as filaments, fibers, fiber pulp and sheets. These copolyamides contain at least 95 mol %, preferably 100 mol %, of the following repeating—exclusively rigid—structural units:

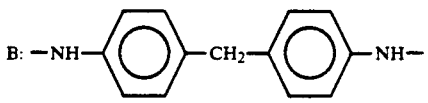

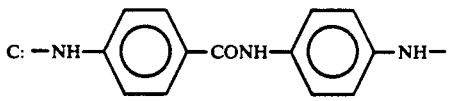

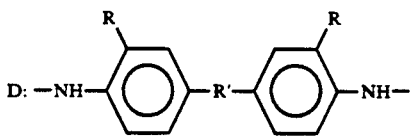

and up to 5 mol % of structural units E and/or F containing m-bonds and being derived from aromatic dicarboxylic acids (E') and/or from aromatic diamines (F'), the sum of the molar proportions of structural units A+E and the sum of the molar proportions of structural units B+C+D+F being essentially the same.

In these formulae, —Ar— is a divalent aromatic radical whose valence bonds are in the para or comparable coaxial or parallel position and which can be substituted by one or two inert radicals, such as lower alkyl or halogen, and —R is hydrogen, lower alkyl radicals, lower alkoxy radicals or halogen.

R' is a direct bond, a polymethylene chain of 2 to 6 carbon atoms, which can be unsubstituted or substituted by one or two alkyl or alkoxy groups of 1 to 4 carbon atoms, or is —O—, —S—, —CO— or —$SO_2$—, or a group of the formula —O—Ar'—O—, in which Ar' has the same meanings as Ar.

The valence bonds which are in a coaxial or parallel position point in opposite directions. One example of coaxial bonds pointing in opposite directions are the diphenyl-4,4' bonds. One example of parallel bonds pointing in opposite directions are, for example, the naphthalene-1,5 or -2,6 bonds, while the naphthalene-1,8 bonds are parallel and point in the same direction. Divalent aromatic radicals —Ar—, in which the valence bonds are in the para or a comparable coaxial or parallel position, are mono- or binuclear fused aromatic radicals, such as, for example, 1,4-phenylene, 1,4-naphthylene, 1,5-naphthylene, 2,6-naphthylene and 1,4-diphenylene.

1,4-Phenylene is preferred as —Ar—.

The radical —Ar— can be mono- or disubstituted by lower alkyl radicals, i.e. straight-chain or branched alkyl radicals of 1 to 4 carbon atoms, or by halogen, in particular by F, Cl or Br. Preferred alkyl substituents are straight-chain and are in particular methyl and ethyl. The preferred halogen substituent is chlorine.

The polyamides according to the invention can contain the unsubstituted radical —Ar— and the alkyl- and/or halogen-substituted radicals —Ar— side by side in varying proportions.

The polyamide can contain one type or several types of substituted radicals —A—; for example, it can contain exclusively methyl-substituted —Ar— radicals or proportions of —Ar— radicals having different alkyl substituents and/or halogen substituents.

However, the polyamides according to the invention can also exclusively contain unsubstituted or substituted radicals —Ar—. For reasons of cost, those polyamides according to the invention are preferred which contain only unsubstituted or up to about 30 mol % of substituted radicals —Ar—.

Ar' has the same meanings as Ar. However, Ar and Ar' can in individual cases be identical or different, i.e. they can have meanings which are identical to or different from those given for Ar.

Lower alkyl radicals and lower alkoxy radicals as —R are also straight-chain or branched and have 1–4 carbon atoms. R is preferably a straight-chain radical and in particular a radical having 1–2 carbon atoms. R is particularly preferably methyl and methoxy. Halogen as R is preferably chlorine.

R' is preferably a direct bond, an ethylene or 1,2-propylene radical, —O—, —CO— or a radical of the formula —O—Ar'—O—, in which Ar' is phenyl.

Structural units B, C and D which originate from the diamines incorporated in the polyamide by condensation are present in the aromatic polyamides according to the invention only in the following specific mole percent ranges, relative to the total amount of components B, C and D:

| | |
|---|---|
| Structural unit B: | 5–60 mol %, preferably 10–40 mol %, |
| Structural unit C: | 10–80 mol %, preferably 10–40 mol %, |
| Structural unit D: | 10–85 mol %, preferably 10–50 mol %. |

These mol % figures refer to the total amount of diamine structural units B, C and D.

Apart from the structural units having bonds in the para position or comparable coaxial or parallel positions pointing in opposite directions, the polyamides according to the invention can have up to 5 mol %, relative to all structural units, of structural units E and F containing m-bonds.

Structural units E and F containing m-bonds are in the context of the present invention those containing an aromatic ring whose bonds along the chain of the polymer molecule are in the m-position relative to one another.

These structural units are, for example, the radicals of isophthalic acid, m-phenylenediamine, 3,4,-diaminodiphenyl ether or alkyl and/or alkoxy substitution products thereof, or 3,4'- or 3',4-diaminobenzanilide.

It will be appreciated by one skilled in the art that the sum of all structural units (A+E) derived from aromatic acids and the sum of all structural units (B+C+D+F) derived from aromatic amines are essentially the same, i.e. that they differ at most by about 1%, preferably at most by 0.2%, and are in particular within the practical measurement and metering possibilities identical.

The aromatic polyamides according to the invention are soluble in organic aprotic polar solvents and can be processed from these solutions directly to give shaped articles.

The articles obtained are distinguished by a combination of very good technological properties. It is in particular possible to produce filaments which are distinguished in combination with comparable strength by a surprisingly increased elongation at break. This property in combination with their solubility in organic solvents and the resulting economically and ecologically advantageous processing possibility represents an extremely valuable enlargement of the technical knowledge in the area of fully aromatic polyamides.

The excellent technological properties of the articles shaped according to the invention are based on the incorporation of the amine building blocks B, C and D within the abovementioned limits. As can be seen from the comparative experiments described below, the technological properties outside the limits given deteriorate considerably.

Aromatic polyaramides containing individual components of the amines B, C and D are generally known.

Thus, in German Offenlegungsschrift No. 3,510,655 cited above, Comparative Example 6 shows that a terephthalamide of 3,3'-dimethylbenzidine is insoluble in amide solvents and thus cannot be spun.

The use of 3,3'-dimethylbenzidine for the preparation of aramides is also cited in the following publications:
German Patent 3,007,063, page 5, line 25,
Vysokomol. Soed. 12 (1970), No. 10, p. 2185,
U.S. Pat. No. 3,318,849,
Belgian Patent 569,760,
U.S. Pat. No. 3,671,542,
U.S. Pat. No. 3,767,756,
P. W. Morgan: "Condensation Polymers", Intersci. Publ. 1965, page 180; Japanese Kokai Tokkyo Koho JP 55/71,751 (80/71,751) cited in CA 93 (16), 151120k and Japanese Kokai JP 50/154,522 (75/154,522) cited in CA 84 (16), 106885s.

The use of 3,3'-dimethoxybenzidine is described, for example, in
DE-A 1,929,713,
J. Polym. Sci. B2, 369 (1964), U.S. Pat. No. 3,671,542,
Japanese Kokai Tokkyo Koho JP 55/71,751 (80/71,751) cited in CA 93 (16), 151120k.

The use of 4,4'-diaminobenzanilide for the preparation of polyamides has been described several times:

a) In U.S. Pat. No. 3,671,542, Example 31, it is shown that the polyamide from terephthaloyl chloride and 4,4'-diaminobenzanilide is sparingly soluble in amide solvents (cf. also U.S. Pat. No. 3,767,756, Example 5). Filaments of this polymer spun from sulfuric acid achieve only moderate strength and moduli.

According to EP-A 218,269, Table A and B, a diaminobenzanilide/terephthalamide spun from sulfuric acid reaches high strength and a high modulus only after thermal aftertreatment, cf. also EP-A 168,879.

b) U.S. Pat. No. 3,671,542 also describes that a copolyamide from p-phenylenediamine+4,4'-diaminobenzanilide (1:1) and terephthaloyl chloride+dibenzoyl chloride or 2,6-naphthaloyl chloride (1:1) becomes gel-like in amide solvents within a short period of time. The properties of the filaments (spun from sulfuric acid) are moderate. Only a 6-component polymer from (p-phenylenediamine+1,5-diaminonaphthalene+4,4'-diaminobenzanilide) and (terephthaloyl chloride+2,6-naphthaloyl dichloride+dibenzoyl chloride) gives a homogeneous solution in amide solvents. The properties of the filaments spun from sulfuric acid are moderate.

c) According to Preston et al., Polymer Letters 4, 1033 (1966), also cited in DOS 2,144,126, page 1, filaments made of 4,4'-diaminobenzanilide/terephthalamide show low strength and particularly low moduli.

Compare also:
U.S. Pat. No. 3,354,125, Example 4,
J. Polym. Sci. 22, 855 (1969)
J. Appl. Polym. Sci. 16, 3237 (1972), page 3239
J. Macromolec. Sci., Chem. Ed. A7, 325 (1973)
Vysokomol. Soed. Ser. B, 25 (9), 672 d) The preparation of diaminobenzanilide/terephthalamide via the Yamazaki reaction (free acid+diamine+pyridine+diphenyl phosphite) gives only low viscosities: Preston et al., J. Polym. Sci.; Polym. Chem. Ed. 20, 79 (1982).

e) In J. Macromolec. Sci., Chem., A7, 325 (1973) and in Kogyo Kagaku Zassi 1968, 71 (3), 443, copolyamides containing 3,4'-diaminobenzanilide are also described.

As is evident from the publications cited, the polyamides mentioned are in most cases very sparingly soluble in amide solvents and can therefore also not be spun from these organic solvents. Even filaments spun from sulfuric acid have in most cases only moderate properties.

On the other hand, the polyamides of the present invention which were prepared by using mixtures of amine components B+C+D in the abovementioned specific proportions, are surprisingly soluble in amide solvents, filaments spun therefrom have high strength and a high initial modulus, and the values of elongation at break and strength can be varied within particularly wide limits and thus be adapted optimally to the intended purpose of application. While with previously known aramides elongations at break of up to 3% in combination with acceptable strength values can be achieved, an elongation range at break of up to 7% in combination with comparable strength values and of up to 5% in combination with preferred strength values can be covered by using the aromatic polyamide according to the invention.

This broadening of the usable elongation range at break by about 60–120% is extremely surprising.

The aromatic polyamides according to the invention are prepared by solution polycondensation of aromatic dicarbonyl dichlorides with equivalent amounts of mixtures of aromatic diamines in known polyamide solvents, i.e. in aprotic polar solvents of the amide type, such as, for example, N,N-dimethylacetamide, tetramethylurea or in particular in N-methyl-2-pyrrolidone. If desired, halide salts of the first and second group of the periodic table can be added to these solvents in a known manner to increase the solvent power or to stabilize the polyamide solutions. Preferred additives are calcium chloride and/or lithium chloride.

This addition of salt can take place before the polycondensation or advantageously directly after the addition of the acid chloride.

The polycondensation temperatures are usually between −20° C. and +120° C., preferably between +10° C. and +100° C. Particularly good results are obtained at reaction temperatures between +10° C. and +80° C. The polycondensation reactions are preferably carried out in such a manner that, after the reaction is complete, 2 to 15, preferably 5 to 10%, by weight of polycondensation product is present in the solution. Particularly good results are obtained at concentrations of 5.0 to 7.5% by weight.

During the course of the polycondensation, the molecular weight of the polymer increases and therefore also the viscosity of the reaction batch A sufficient molecule chain length is reached as soon as the viscosity of the polymer solution obtained in the polycondensation corresponds to an inherent viscosity of the polymer of about 3.2 to 5.4 dl/g.

Inherent viscosity is understood to mean the expression $$\eta_{inh} = \frac{\ln \eta_{rel}}{c}.$$

$\eta_{rel}$ is the relative viscosity, c the concentration used in g/100 ml.

For the purposes of the present invention, the inherent viscosity was determined on solutions of 0.5 g of polymer each in 100 ml of 98% strength by weight sulfuric acid at 25° C.

The invention also relates to the outlined process known per se for the preparation of aromatic polyamides insofar as it serves for preparing the aromatic polyamides according to the invention described above. This process according to the invention comprises reacting 95 to 100 mol % of acid chlorides of the formula Cl—OC—Ar—CO—Cl    (A')

and 0 to 5 mol % of dichlorides of aromatic dicarboxylic acids (E') containing m-bonds with an equivalent amount of a diamine mixture composed of 95–100 mol % of a mixture of diamines comprising 5–60 mol %, preferably 10–40 mol %, of diamines of the formula

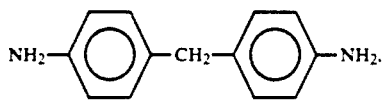

(B')

10-80 mol %, preferably 10-50 mol %, of diamines of the formula

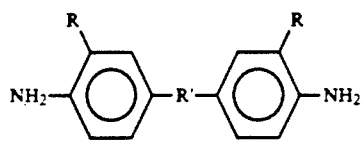

(D')

and 10-80 mol %, preferably 10-40 mol %, of 4,4'-diaminobenzanilide (C') and 0 to 5 mol % of aromatic diamines (F') containing m-bonds in the manner mentioned with one another.

The carbonyl chlorides of the formula A' are derived, for example, from the following dicarboxylic acids: terephthalic acid, alkyl, alkoxy or halogen derivatives thereof, such as, for example, bromo- or chloroterephthalic acid, 2,5-dichloroterephthalic acid, methylterephthalic acid, 2,6-dimethylterephthalic acid, 2,3- or 2,5- or 2,6-dimethoxyterephthalic acid; 1,4-, 1,5- or 2,6-naphthalenedicarboxylic acid and alkyl, alkoxy or halogen derivatives thereof, such as, for example, 4-chloronaphthalene-2,6-dicarboxylic acid, 1,5-dimethoxynaphthalene-2,6-dicarboxylic acid, 4,4'-diphenyldicarboxylic acid and alkyl, alkoxy or halogen derivatives thereof, such as, for example, 3,3'-dimethyldiphenyl-4,4'-dicarboxylic acid, and 2,2'-dimethoxydiphenyl-4,4'-dicarboxylic acid.

The preferred carbonyl chloride of the formula A' is terephthaloyl dichloride.

Examples of suitable diamines of the formula D, are the following compounds:

a) if R' is a direct bond:
   3,3'-dimethyl-, 3,3'-dimethoxy- or 3,3'-dichlorobenzidine;

b) if R' is a substituted or unsubstituted polymethylene chain:
   1,2-bis-(4-aminophenyl)-ethane and derivatives thereof which are alkyl-, haloqen- or alkoxy-substituted in the 3 position of the phenyl rings, such as 1,2-bis(4-amino-3-methylphenyl)ethane, 1,2-bis(4-amino-3-methoxyphenyl)ethane, 2-methyl-1,2-bis(4-aminophenyl)ethane, 2,3-bis(4-aminophenyl)butane, 1,2-bis(4-aminophenyl)butane, 1,6-bis(4-aminophenyl)hexane, 1,2- or 3,4-bis(4-aminophenyl)hexane and derivatives thereof which are alkyl-, halogen- or methoxy-substituted in the 3 position of the phenyl rings, such as, for example, 1,2-bis(4-amino-3-chlorophenyl)butane, 2-methoxy-1,2-bis(4-amino-3-methylphenyl)ethane, 2-ethoxy-1,2-bis(4-amino-3-methylphenyl)ethane;

c) if R' is —O—Ar'—O—:
   1,4-bis-(4-aminophenoxy)benzene, 1,4-bis(4-amino-3-methylphenoxy)benzene, 1,4-bis(4-amino-3-methylphenoxy)-2,5-dimethylbenzene, 1,4-bis(4-amino-3-methoxyphenoxy)-2-methoxybenzene, 1,4-bis(4-amino-2-chlorophenoxy)-2,5-dichlorobenzene;

d) if R' is one of the abovementioned radicals —O—, —S—, —CO— or —SO$_2$—:
   4,4,-diaminodiphenyl ether and 3,3,-dialkyl, -dialkoxy and -dichloro derivatives thereof, for example 4,4'-diamino-3,3'-dimethoxydiphenyl ether; 4,4'-diaminodiphenyl sulfide and 3,3'-dialkyl, -dialkoxy and -dichloro derivatives thereof, such as, for example, 4,4'-diamino-3,3'-dimethyldiphenyl sulfide; 4,4'-diaminobenzophenone and 3,3'-dialkyl, -dialkoxy and -dichloro derivatives thereof, such as, for example, 4,4'-diamino-3,3'-dimethyl (or -3,3'-dimethoxy or -3,3'-dichloro)-benzophenone, 4,4'-diaminodiphenyl sulfone and 3,3'-dialkyl, -dialkoxy and -dichloro derivatives thereof, such as, for example, 4,4'-diamino-3,3'-dimethyldiphenyl (or -3,3'-dimethoxy or -3,3'-dichloro)diphenyl sulfone.

Aromatic dicarbonyl dichlorides and aromatic diamines containing m-bonds in the context of the present invention are those in which the bond directions of the two carbonyl chloride groups or the two amino groups form an angle with one another which corresponds to that of m-bonds. Dicarbonyl dichlorides or diamines of this type are, for example, isophthaloyl dichloride, m-phenylenediamine, 3,4'-diaminodiphenyl ether or alkyl and/or alkoxy substitution products thereof, or 3,4'- or 3',4-diaminobenzanilide.

In this procedure, the resulting polyamides according to the invention remain dissolved in the solvent.

When the polymer solution has reached the required viscosity for further processing, the polycondensation can be stopped in the usual manner by the addition of monofunctional compounds, such as, for example, acetyl chloride. The hydrogen chloride formed and bound loosely to the amide solvent is then neutralized by adding basic substances. Examples of suitable bases are lithium hydroxide, calcium hydroxide, but in particular calcium oxide.

Shaped articles are manufactured from the polyamides according to the invention by filtering, degassing and further processing the resulting neutralized solutions of the polyamides according to the invention in a known manner to give filaments, fibers, fiber pulp, films or also sheets, to which the invention also relates. This can take place, for example, by using a wet-spinning machine, where the polymer solution is extruded into a coagulation bath through suitable nozzles, the filaments obtained are led through wash baths and drawn at elevated temperature. Suitable coagulation baths are aqueous solutions of the same amide solvent which was also used for the preparation of the polymer. However, it is also possible to use aqueous salt solutions, such as, for example, calcium chloride solutions.

When the polymer solutions are extruded and the shaped articles, such as filaments or sheets, are removed from the coagulation bath, these articles are wet-drawn only to a relatively small extent. After removal from the coagulation baths, the articles must therefore, after the usual washing and drying, be subjected to further drawing in order to give them the desired mechanical properties, such as a high modulus of elasticity and high elongation at break.

When the filaments and fibers and sheets according to the invention are manufactured, the total drawing is made up of minor wet-drawing and a subsequent higher draw ratio. As a rule, this is carried out in the usual manner at elevated temperature in drawing units, in which drawing in one or several steps takes place between galettes running at different rotational speeds.

To heat the filaments to the required drawing temperature, a contact drawing can be carried out by drawing the filaments over hotplates ("hot press") disposed in the drawing unit, said hotplates having surface temperatures of 280° C. to 460° C., preferably 340° C. to 450° C. The filaments are drawn at a draw ratio of 4.0:1 to about 15:1, preferably 4:1 to 12:1.

A likewise suitable variation of the spinning process is the "dry-nozzle wet-spinning process", as described, for example, in U.S. Pat. No. 3,414,645. There, the spinning is carried out from top to bottom, and the spun filaments, after leaving the nozzle, first pass a gaseous medium, preferably air, and then enter an aqueous coagulation bath. The further treatment of the filaments thus produced is carried out as described above. The shaped articles manufactured from the raw materials according to the invention, such as, for example, fibers, filaments, fiber pulp or sheets serve, for example, as reinforcing materials for plastics or as industrial materials for filtration and insulation. For insulation purposes, it is also possible to apply a polymer solution as a film to the article to be insulated and then to remove the solvent and any solubilizers present.

The examples which follow serve to further illustrate the invention. The proportions of dicarboxylic acid components and diamine components were in each case calculated as 100 mol %.

EXAMPLE 1

Aromatic copolyamide comprising 100 mol % of terephthaloyl dichloride, 50 mol % of 4,4'-diaminobenzanilide, 25 mol % of 4,4'-diaminodiphenylmethane and 25 mol % of 1,4-bis(aminophenoxy)benzene 45.4 g (0.2 mol) of 4,4'-diaminobenzanilide, 19.8 g (0.1 mol) of 4,4'-diaminodiphenylmethane and 29.2 g (0.1 mol) of 1,4-bis(aminophenoxy)benzene were dissolved under nitrogen in 2100 g of N-methylpyrrolidone, and 81.2 g (0.4 mol) of terephthaloyl chloride were added between 20° C. and 60° C. over a period of 65 minutes. The solution was stirred at 68° C. for another 30 minutes and neutralized with 24.5 g of CaO at 78° C. The inherent viscosity was $\eta_{inh}=3.9$ dl/g.

The solution was filtered, degassed and wet-spun. For this purpose, it was spun from a nozzle having 100 orifices each of 0.1 mm diameter into a coagulation bath composed of a hot solution at 80° C. of 35% of N-methylpyrrolidone in water at a rate of 16.2 m/min. The filaments obtained were led through two water baths, a washing machine, over a dry galette and finally over a hot press at a temperature of 400° C. at a rate of 69.2 m/min.

The single filament titer was 2.22 dtex at a tenacity of 96 cN/tex, an elongation of 4.5% and an initial modulus of 27 N/tex, based on 100% elongation.

EXAMPLE 2

Aromatic copolyamide comprising 100 mol % of terephthaloyl dichloride, 20 mol % of 4,4'-diaminodiphenylmethane, 20 mol % of 4,4'-diaminobenzanilide and 60 mol % of 3,3'-dimethylbenzidin The following were reacted in the same manner as that described in Example 1:

15.7 g (0.08 mol) of 4,4'-diaminodiphenylmethane, 18.2 g (0.08 mol) of 4,4'-diaminobenzanilide and 50.9 g (0.24 mol) of 3,3'-dimethylbenzidine in 2100 g of N-methylpyrrolidone with 81.2 g (0.4 mol) of terephthaloyl chloride.

Upon reaching the desired viscosity ($\eta_{inh}=4.2$ dl/g), the polycondensation was stopped by adding 2.2 g of benzoyl chloride, and the mixture was neutralized with 24.5 g of calcium oxide.

The solution was spun through a 30-orifice nozzle having an orifice diameter of 0.1 mm into a 38% strength N-methylpyrrolidone solution at 80° C. The material was washed, dried, and drawn to 7.8 times its length at 380° C. to give filaments having single filament titers of 1.0 dtex, a tenacity of 100 cN/tex, an elongation of 4.1% and an initial modulus of 45 N/tex.

EXAMPLE 3

Aromatic copolyamide comprising 100 mol % of terephthaloyl chloride, 12.5 mol % of 3,3'-dimethoxybenzidine, 37.5 mol % of 4,4'-diaminobenzanilide and 50 mol % of 4,4'-diaminodiphenylmethane 12.2 g (0.05 mol) of 3,3'-dimethoxybenzidine, 34.5 g (0.15 mol) of 4,4'-diaminobenzanilide, 39.6 g (0.2 mol) of 4,4'-diaminodiphenylmethane were dissolved in 2100 g of N-methylpyrrolidone. 81.2 g of terephthaloyl chloride were added between 10° C. and 70° C. The viscous solution ($\eta_{inh}=3.9$ dl/g) was neutralized with 24.5 g of calcium oxide and then filtered and degassed.

The solution was spun by a wet-spinning process through a nozzle having 100 orifices each of 0.1 mm diameter into a coagulation bath composed of 35% strength aqueous N-methylpyrrolidone solution at 60° C. After washing and drying, the filaments were drawn to 7.2 times their length on a hot press at 380° C.

The filaments had the following properties: single filament titer: 1.7 dtex, tenacity 78 cN/tex, elongation of 4.7% and a modulus of 22 N/tex.

EXAMPLE 4

Aromatic copolyamide comprising 100 mol % of terephthaloyl chloride, 50 mol % of 4,4'-diaminodiphenylmethane, 25 mol % of 4,4'-diaminobenzanilide and 25 mol % of 3,3'-dichlorobenzidine 39.2 g (0.2 mol) of 4,4'-diaminodiphenylmethane, 22.7 g (0.1 mol) of 4,4'-diaminobenzanilide, 25.3 g (0.1 mol) of 3,3'-dichlorobenzidine and 11.1 g of lithium chloride were dissolved in 2100 g of N-methylpyrrolidone. 81.2 g (0.4 mol) of terephthaloyl chloride were added between 10° C. and 70° C. The viscous ($\eta_{inh}=4.6$ dl/g) solution was neutralized with 24.5 g of calcium oxide (96% strength), then filtered and degassed.

The solution was spun through a 100-orifice nozzle having an orifice diameter of 0.1 mm into a 35% strength aqueous N-methylpyrrolidone coagulation bath at 80° C. The filaments were washed, dried and drawn to 6.1 times their length on a hot press at 400° C. The filaments then had single filament titers of 1.99 dtex; a tenacity of 82 cN/tex, an elongation of 5.0% and a modulus of 21 N/tex.

EXAMPLE 5

Aromatic copolyamide comprising 100 mol % of terephthaloyl dichloride, 50 mol % of 4,4'-diaminobenzanilide, 15 mol % of 4,4'-diaminodiphenylmethane and 35 mol % of 1,4-bis(aminophenoxy)benzene 45.4 g (0.2 mol) of 4,4'-diaminobenzanilide, 11.9 g (0.06 mol) of 4,4'-diaminodiphenylmethane, and 40.9 g (0.14 mol) of 1,4-bis(aminophenoxy)benzene were dissolved under nitrogen in 2100 g of N-methylpyrrolidone, and 81.2 g (0.4 mol) of terephthaloyl chloride were added between 20° C. and 60° C. over a period of 65 minutes. The solution was stirred at 68° C. for another 30 minutes, and neutralized with 24.5 g of CaO at 78° C. The inherent viscosity was $\eta_{inh} = 5.0$ dl/g.

The solution was filtered, degassed and wet-spun. For this purpose, it was spun from a nozzle having 100 orifices each of 0.1 mm diameter into a coagulation bath composed of a hot solution at 80° C. of 35% of N-methylpyrrolidone in water at a rate of 16.2 m/min. The filaments obtained were led through two water baths, a washing machine, over a dry galette and finally over a hot press at a temperature of 400° C. at a rate of 69.2 m/min.

The single filament titer was 2.22 dtex at a tenacity of 110 cN/tex, an elongation of 4.0% and an initial modulus of 34 N/tex, based on 100% elongation.

EXAMPLE 6

Aromatic copolyamide comprising 100 mol % of terephthaloyl dichloride, 50 mol % of 4,4'-diaminodiphenylmethane, 25 mol % of 4,4'-diaminobenzanilide and 25 mol % of 3,3'-dimethylbenzidine The following were reacted in the same manner as that described in Example 1:

39.6 g (0.2 mol) of 4,4'-diaminodiphenylmethane, 22.7 g (0.1 mol) of 4,4'-diaminobenzanilide and 21.2 g (0.1 mol) of 3,3'-dimethylbenzidine in 2100 g of N-methylpyrrolidone with 81.2 g (0.4 mol) of terephthaloyl chloride.

Upon reaching the desired viscosity ($\eta_{inh} = 4.2$ dl/g), the polycondensation was stopped by adding 2.2 g of benzoyl chloride, and the mixture was then neutralized with 24.5 g of calcium oxide.

The solution was spun through a 30-orifice nozzle having an orifice diameter of 0.1 mm into a 38% strength N-methylpyrrolidone solution at 80° C. The material was washed, dried and drawn to 7.8 times its length at 380° C. to give filaments having single filament titers of 1.0 dtex, a tenacity of 77 cN/tex, an elongation of 4.4% and an initial modulus of 22 N/tex.

Comparative Examples A-E which follow were carried out in accordance with the procedures given in DE-A 3,510,655. The compositions of the polymers and their properties are listed in the table below. The abbreviations used in the table have the following meanings:

| | |
|---|---|
| DADPM: | 4,4'-diaminodiphenylmethane |
| DMOB: | 3,3'-dimethoxybenzidine |
| BAPOB: | 1,4-bis(aminophenoxy)benzene |
| DMB: | 3,3'-dimethylbenzidine |
| PPD: | p-phenylenediamine |
| DCIB: | 3,3'-dichlorobenzidine |

TABLE

| Polymer composition [mol %]: 100 mol % of terephthaloyl chloride + | | Tenacity [cN/tex] | Modulus [N/tex] | Elongation [%] |
|---|---|---|---|---|
| DMOB | 60 | | | |
| DADPM | 20 | 103 | 47 | 2.8 |
| PPD | 20 | | | |
| DMOB | 50 | | | |
| DADPM | 25 | 92 | 43 | 2.9 |
| PPD | 25 | | | |
| DCIB | 25 | | | |
| DADPM | 25 | 67 | 35 | 2.7 |
| PPD | 50 | | | |
| BAPOB | 40 | | | |
| DMB | 10 | 95 | | 3.3 |
| PPD | 50 | | | |
| BAPOB | 20 | | | |
| DMB | 50 | 119 | | 2.8 |
| PPD | 30 | | | |

We claim:

1. An aromatic copolyamide, soluble in organic polyamide solvents, which contains at least 95 mol % of the repeating structural units of the formulae A: —OC—Ar—CO—

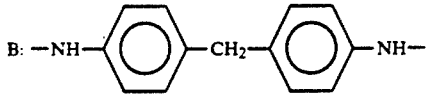

B: —NH—⟨○⟩—CH₂—⟨○⟩—NH—

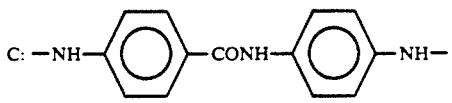

C: —NH—⟨○⟩—CONH—⟨○⟩—NH—

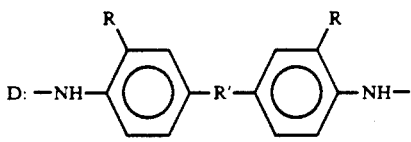

D: —NH—⟨○⟩—R'—⟨○⟩—NH—  (with R substituents)

and up to 5 mol % of structural units E of F or combinations of structural units E and F, said structural units E and F containing m-bonds and being derived from an aromatic dicarboxylic acid or from an aromatic diamine or from an aromatic dicarboxylic acid and an aromatic diamine, the sums of the molar proportions of structural units A+E and the molar proportions of structural units B+C+D+F being essentially the same, in which —Ar— is a divalent aromatic radical which has valence bonds in the para or comparable coaxial or parallel position and which is unsubstituted or substituted by one or two inert radicals, —R is hydrogen, lower alkyl radicals, lower alkoxy radicals or halogen, R' is a direct bond, or R' is a polymethylene chain of 2 to 6 carbon atoms, which is unsubstituted or substituted by alkyl or alkoxy groups of 1 to 4 carbon atoms, or is —O—, —S—, —CO— or —SO₂—, or a group of the formula —O—AR-'—O—, in which Ar' has the same meanings as Ar, and the proportions of the diamine structural units B, C and D, relative to the total amount of these diamine structural units, are within the following limits:

| | |
|---|---|
| structural unit B: | 5-60 mol %, |
| structural unit C: | 10-80 mol %, |
| structural unit D: | 10-85 mol %. |

2. A copolyamide as claimed in claim 1, wherein —Ar— is 1,4-phenylene, 1,4-, 1,5- or 2,6-naphthylene or 1,4-diphenylene.

3. A copolyamide as claimed in claim 1, wherein —Ar— is a 1,4-phenylene radical which is unsubstituted or substituted by a lower alkyl radical or a halogen atom.

4. A copolyamide as claimed in claim 1, wherein —Ar— is a 1,4-phenylene radical which is unsubstituted or substituted by a methyl group or a chlorine atom.

5. A copolyamide as claimed in claim 1, wherein —Ar— is an unsubstituted 1,4-phenylene radical.

6. A copolyamide as claimed in claim 1, wherein R' is a direct bond, or R' is an ethylene or 1,2-propylene radical, —O—, —CO— or a radical of the formula —O—Ar'—O—, in which Ar' is phenyl.

7. A copolyamide as claimed in claim 1, wherein —R is methyl, methoxy or chlorine.

8. A copolyamide as claimed in claim 1, wherein the structural unit E or F containing m-bonds is the divalent radical of 3,4'- or 3',4-diaminobenzanilide.

9. A copolyamide as claimed in claim 1, wherein the proportions of the diamine components B, C and D, relative to the total amount of diamine components, are within the following limits:

| | |
|---|---|
| diamine B: | 10–40 mol % |
| diamine C: | 10–40 mol % |
| diamine D: | 10–50 mol %. |

10. A copolyamide as claimed in claim 1, wherein the divalent radical —Ar— is substituted, and said inert radical or radicals with which said divalent radical —Ar— is substituted is lower alkyl or halogen.

11. A shaped article of the aromatic copolyamide of claim 1.

12. A shaped article as claimed in claim 11, wherein the article is a filament, fiber pulp, sheet, or membrane.

* * * * *